3,001,911
HYDRATED CALCIUM ACID NOVOBIOCIN AND PROCESS OF MAKING SAME

John W. Shell, Kalamazoo, Mich., assignor to The Upjohn Company, Kalamazoo, Mich., a corporation of Michigan
No Drawing. Filed Dec. 16, 1957, Ser. No. 702,835
7 Claims. (Cl. 167—65)

This invention relates to a novel composition of matter and to a method for preparing the same. More particularly, the invention relates to finely divided, calcium acid novobiocin hydrate, and therapeutic compositions prepared therefrom; and a process for prepaing calcium acid novobiocin hydrate, and stable aqueous suspensions therefrom.

Novobiocin is an antibiotic produced by fermentation in cultures of *Streptomyces niveus* and *Streptomyces spheroides*. It is active against many gram positive microorganisms, but is especially effective in the treatment of serious micrococcic (staphylococcic) infections. Its use is particularly indicated for serious types of infections when the patient is allergic to other drugs, or in which the micrococci are resistant to older antimicrobial agents. It has produced superior results in the treatment of cellulitis, various abscesses and ulcers, postoperative wound infections, and micrococcic enteritis and septicemia. Novobiocin has also been used for the treatment of proteus infections.

Previously, novobiocin has been available in the form of its calcium salt and its sodium salt. The sodium salt is not completely stable in all dosage forms containing water, and consequently calcium acid novobiocin has heretofore been the drug of choice in dosage forms containing water. Some aqueous suspensions of calcium acid novobiocin however, have not been entirely satisfactory because during storage or transportation there is a tendency for the particles of calcium acid novobiocin to agglomerate and cake. When this occurs the suspensions cannot be reconstituted by shaking and are therefore useless for therapeutic purposes.

It is, therefore, an object of this invention to provide aqueous dispersions of calcium acid novobiocin in which the dispersed calcium acid novobiocin has little or no tendency to agglomerate and cake during transportation or storage; a further object is to provide calcium acid novobiocin in a new form which in aqueous dispersion has little or no tendency to agglomerate or cake during transportation or storage and to provide an effective, reproducible, and facile method for accomplishing the same. Still other objects of the invention will become apparent to persons skilled in the art as the description proceeds.

These objects of the invention are accomplished, and agglomeration and caking of calcium acid novobiocin in aqueous suspensions are avoided by hydrating the calcium acid novobiocin and forming an aqueous dispersion of the hydrated calcium acid novobiocin.

The hydration of the calcium acid novobiocin is accomplished by heating it in the presence of water. A satisfactory procedure involves mixing the calcium acid novobiocin with sufficient water to make a slurry, providing a means for agitating the mixture, e.g. a simple propeller type stirrer, and a controllable source of heat. During the hydration step, it is advantageous and desirable to maintain the particles in a dispersed state by stirring or otherwise agitating the slurry. Thorough agitation during the process helps to maintain a uniform temperature throughout the mixture, and accelerates the hydration by increasing the area of the crystals:water interface. As the hydration proceeds, it is sometimes desirable to add increments of water in order to prevent undue thickening of the slurry and concomitant slowing of the hydration.

Under ordinary conditions the heating and agitation should be continued for about two hours at a temperature of about sixty to ninety degrees centigrade. However, the relationship of time and temperature are dependent and the same result can be achieved by heating at a higher temperature for a correspondingly shorter time. Thus, by autoclaving the suspension so that a temperature above 100 degrees centigrade can be obtained, the time required to impart the desired degree of stability to the suspension is decreased proportionately.

After hydration is completed, aqueous dispersions of the calcium acid novobiocin hydrate can be prepared in several ways. The slurry can be cooled, comminuted via a ball mill, Fitzpatrick comminuting machine, hammer mill, ultrasonic grinder, colloid mill, or homogenizer, and then dispersed in a suitable pharmaceutical medium. Alternatively, the hydrated calcium acid novobiocin can be freed of excess water by suitable drying techniques, and then comminuted, and dispersed in a suitable pharmaceutical medium. Air-blast microcomminution is a satisfactory method for achieving the finely divided state when the hydrated calcium acid novobiocin has been freed of excess water. Another efficacious procedure involves mixing the hydrated calcium acid novobiocin with a suitable pharmaceutical medium and then comminuting in a colloid mill, Fitzpatrick comminuting machine, hammer mill, ultrasonic grinder, ball mill, or homogenizer.

The hydration reaction and comminution can be accomplished at the same time by putting the slurry in a ball mill and heating for the required period while the particles are being milled.

By methods such as those outlined above, dispersions having an average particle size of from four to five microns can be prepared.

The hydration of calcium acid novobiocin is accelerated by adding a small amount of a pharmaceutically acceptable wetting agent to the slurry. The interfacial tension between the aqueous medium and the calcium acid novobiocin is reduced and the calcium acid novobiocin crystals are more effectively wetted. Absorption of water is thus enhanced so that the hydration is accomplished in a shorter time.

A number of wetting agents such as polyoxyethylene sorbitan monolaurate (Tween 20), polysorbate 80 U.S.P., sorbitan monolaurates (Span 20 and Span 40), sodium lauryl sulfate, polyoxyl 40 stearate U.S.P., ethylene oxide-polypropylene glycol condensate. (Pluonic F-68, Wyandotte Chemical Co.), alone or in conjunction with other wetting agents can be advantageously employed to accelerate the hydration process.

The concentration of wetting agent cannot be specified exactly because the conditions of the hydration itself can be varied over substantial limits with respect to initial particle size of calcium acid novobiocin, and concentration of the slurry. Ordinarily, however, from 0.01 to 5 percent will suffice.

The hydrate of calcium acid novobiocin which results from the above treatment possesses a crystal structure which can be differentiated from that of the original unhydrated form by X-ray crystallographic data. Two major lines are characteristic. They represent interplanar spacings of 19.2 angstroms and 3.63 angstroms. The major long spacing of 19.2 angstroms is significantly distinct from the major long spacing of 11.9 angstroms observed with non-hydrated crystals. The spacing at 3.63 angstroms is not coincident with any spacings known for the non-hydrated form.

The following examples are illustrative of the processes and products of this invention and are not to be construed as limiting.

EXAMPLE 1

*Preparation of hydrated calcium acid novobiocin*

Two hundred (200) grams of calcium acid novobiocin was mixed with sufficient water to produce a slurry. This suspension was stirred vigorously (but not whipped) and heated for two hours at seventy degrees centigrade. The hydrated product was then dried at eighty degrees centigrade under high vacuum for twelve hours. The final product contained 11.6 percent water. It was micropulverized under airblast. The final preparation contained 6.8 percent water and made a stable product which was much less crystalline than unhydrated preparations, and gave a distinct X-ray diffraction pattern, characterized by interplanar spacings of 19.2 and 3.63 angstroms.

EXAMPLE 2

*Preparation of hydrated calcium acid novobiocin*

Five hundred (500) grams of calcium acid novobiocin was mixed with sufficient water to produce a slurry and heated to 65 degrees centigrade for about two hours. It was filtered and dried at high vacuum at fifty degrees centigrade; it was dried overnight at air-temperature, dried for three hours at eighty degrees centigrade in an oven, then at ninety degrees centigrade for three hours, and finally 45 degrees centigrade for two hours. The hydrated crystals contained twenty percent water, and gave the same X-ray diffraction pattern as the product of Example 1. The product was micropulverized as in Example 1, and incorporated in an aqueous suspension, which was stored for six months at 25 degrees centigrade, 40 degrees centigrade, and 47 degrees centigrade. There was no thermally induced solidification or caking and as shown by the data given in the following table, there was little loss of potency or evidence of thermal instability.

| Initial Assay | Theory | After 6 months at room temp. | After 6 months at 40° C. | After 6 months at 47° C. |
| --- | --- | --- | --- | --- |
| 134 mg. per 5 cc | 137.5 | 128 | 123 | 120.5 |

EXAMPLE 3

*Preparation of hydrated calcium acid novobiocin*

Five hundred (500) grams of calcium acid novobiocin was mixed with sufficient water to produce a slurry, and 3.5 grams of sodium lauryl sulfate was added. The mixture was heated to sixty degrees centigrade with stirring and held at that temperature for one hour and 45 minutes. It was then dried as in Example 1. The hydrated calcium acid novobiocin product gave the characteristic X-ray diffraction pattern of hydrated calcium acid novobiocin and after comminution produced stable aqueous pharmaceutical suspensions.

EXAMPLE 4

Fifty gallons of a syrup containing hydrated calcium acid novobiocin is prepared from the following types and amounts of ingredients:

Each five cubic centimeters contains:

0.075% w./v. methylparaben U.S.P. __ 5 oz.
0.025% w./v. propylparaben U.S.P. __ 1 oz. 293 grs.
0.035% w./v. dye __ 2 oz. 147 grs.
0.04% v./v. sorbitan trioleate __ 2 oz. 269 minims.
0.01% v./v. polyoxyethylene sorbitan trioleate __ 307 minims.
(134.38 mg.) hydrated calcium acid novobiocin __ 13 lbs. 12 oz.
Tragacanth powder U.S.P. __ 1 lb. 4 oz.
65% w./v. sugar granular U.S.P. __ 271 lbs.
0.024% v./v flavors __ 1 oz. 269 minims.
Deionized water, q.s. ad __ 50 gals.

The methylparaben and propylparaben are dispersed in 28 gallons, one pint of deionized water. The sorbitan trioleate and polyoxyethylene sorbitan trioleate, which function as defoamers, are mixed and added to the foregoing solution with stirring until homogeneous (about one hour). The hydrated calcium acid novobiocin is added with stirring. The tragacanth and sugar are added with stirring until the sugar has dissolved. The suspension is passed through a colloid mill to assure a uniform suspension. Sufficient deionized water is added to make a total volume of fifty gallons, and the suspension is again mixed well.

EXAMPLE 5

One hundred (100) gallons of a drop-dosage preparation containing finely divided hydrated calcium acid novobiocin is prepared from the following ingredients.

Each cubic centimeter contains:

0.075% methylparaben U.S.P. __ 10 oz.
0.025% propylparaben U.S.P. __ 3 oz. 148 grs.
0.04% dye __ 5 oz. 295 grs.
110 mg.) finely divided hydrated calcium acid novobiocin __ 106 lbs. 6 oz.
0.1% sorbitan trioleate __ 13 oz. 154 grs.
0.2% tragacanth powder U.S.P. __ 1 lb. 10 oz. 308 grs.
58% sugar granular U.S.P. __ 484 lbs.
Deionized water, q.s. ad __ 100 gals.

The methylparaben, propylparaben and the dye are thoroughly mixed in forty gallons of deionized water. The finely divided hydrated calcium acid novobiocin is added and mixed well. The sorbitan trioleate is added with stiring to remove air. The tragacanth and sugar are added with stirring. Then deionized water is added to make a volume of 95 gallons and mixed until the sugar is completely dissolved. The suspension is then processed through a homogenizer. Sufficient deionized water is added to make a total volume of 100 gallons and the suspension is again mixed thoroughly.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

I claim:

1. A stable aqueous suspension of micropulverized hydrated calcium acid novobiocin.

2. A therapeutic composition comprising, as an essential active ingredient, micropulverized hydrated calcium acid novobiocin dispersed in an aqueous medium.

3. A process for producing a stable aqueous suspension of finely divided hydrated calcium acid novobiocin which comprises heating a slurry of calcium acid novobiocin in an aqueous dispersion medium with continuous agitation until the calcium acid novobiocin is hydrated, comminuting, and dispersing in an aqueous medium.

4. The process of claim 3 wherein the calcium acid novobiocin is heated in water containing a pharmaceutically acceptable wetting agent.

5. The process of claim 3 wherein the aqueous slurry of calcium acid novobiocin is heated and stirred at a temperature between about seventy and ninety degrees centrigrade for about two hours.

6. Calcium acid novobiocin containing 6.8 to 20 percent water of crystallization.

7. Micropulverized, calcium acid novobiocin containing from 6.8 to 20 percent water of crystallization.

References Cited in the file of this patent

Hoeksema et al.: Antibiotics and Chemo therapy, vol. 6, February 1956, pp. 143–148.

Chaiet et al.: Antibiotics and Chemotherapy 7, May 1957, pp. 231–234.